(12) United States Patent
Merchant et al.

(10) Patent No.: US 8,540,257 B1
(45) Date of Patent: Sep. 24, 2013

(54) DYNAMIC STEERING STABILIZER DEVICE FOR VEHICLES

(71) Applicants: David Merchant, Lincoln, NE (US); Tyler Swartz, Omaha, NE (US)

(72) Inventors: David Merchant, Lincoln, NE (US); Tyler Swartz, Omaha, NE (US)

(73) Assignee: Automatic Equipment Manufacturing Company

( * ) Notice: Subject to any disclaimer, the term of this patent is extended or adjusted under 35 U.S.C. 154(b) by 0 days.

(21) Appl. No.: 13/666,597

(22) Filed: Nov. 1, 2012

(51) Int. Cl.
*B62D 7/22* (2006.01)
*F16F 1/00* (2006.01)

(52) U.S. Cl.
USPC ............ 280/89.12; 280/93.512; 280/124.106; 267/150

(58) Field of Classification Search
USPC ............... 280/5.511, 5.522, 89, 89.11, 89.12, 280/89.13, 90, 93.5, 93.501, 93.512, 124.106; 267/34, 150, 221; 180/12, 400, 410, 421, 180/436, 439
See application file for complete search history.

(56) References Cited

U.S. PATENT DOCUMENTS

| | | | |
|---|---|---|---|
| 3,250,524 A * | 5/1966 | Boatright | 267/138 |
| 4,230,309 A | 10/1980 | Schnitzius | |
| 4,359,123 A | 11/1982 | Haupt et al. | |
| 4,406,473 A | 9/1983 | Sexton | |
| 4,410,193 A | 10/1983 | Howard | |
| 4,418,931 A | 12/1983 | Howard | |
| 4,534,577 A | 8/1985 | Howard | |
| 4,736,931 A | 4/1988 | Christopherson | |
| 4,822,012 A | 4/1989 | Sketo | |
| 4,925,165 A * | 5/1990 | Sketo | 267/221 |
| 4,993,522 A | 2/1991 | Wagner | |
| 5,481,871 A | 1/1996 | McFadyen | |
| 5,527,053 A | 6/1996 | Howard | |
| 5,816,594 A | 10/1998 | Howard | |
| 5,890,705 A * | 4/1999 | Lee | 267/150 |
| 5,896,959 A * | 4/1999 | Jeffries et al. | 267/250 |
| 6,126,154 A | 10/2000 | Shepherd | |
| 6,237,904 B1 | 5/2001 | Shepherd | |
| 6,267,395 B1 | 7/2001 | Howard | |
| 6,296,089 B1 | 10/2001 | Koch et al. | |
| 6,347,573 B1 | 2/2002 | Henkel et al. | |
| 6,520,520 B2 | 2/2003 | Howard | |
| 6,698,777 B1 | 3/2004 | Shepherd | |
| 7,494,132 B2 * | 2/2009 | Smay | 280/5.508 |

\* cited by examiner

*Primary Examiner* — Ruth Ilan
*Assistant Examiner* — Darlene P Condra
(74) *Attorney, Agent, or Firm* — Donald R. Schoonover

(57) ABSTRACT

A steering stabilizer includes a device connecting a fixed part of a vehicle to a steering mechanism of the vehicle, a control mechanism, and a centering mechanism. The control mechanism, which normally maintains an equilibrium configuration, includes a first member connected to a cylinder portion of a gas spring and a second member secured to a rod portion of the gas spring. A centering mechanism maintains alignment of the gas spring with the device. When the stabilizer is extended from the equilibrium configuration, the gas spring is activated to responsively and automatically return the stabilizer to the equilibrium configuration; and when the device is compressed from the equilibrium configuration, the gas spring is activated to responsively and automatically return the stabilizer to the equilibrium configuration.

12 Claims, 2 Drawing Sheets

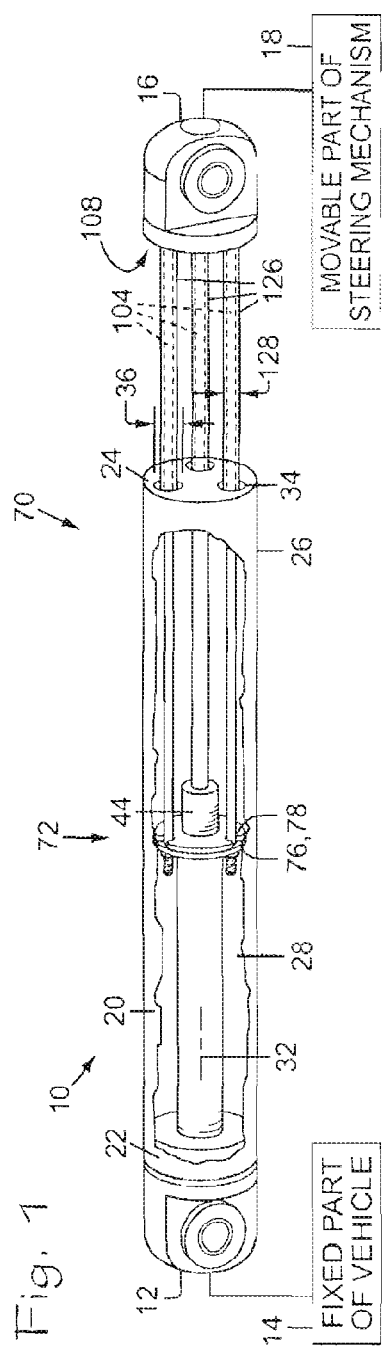

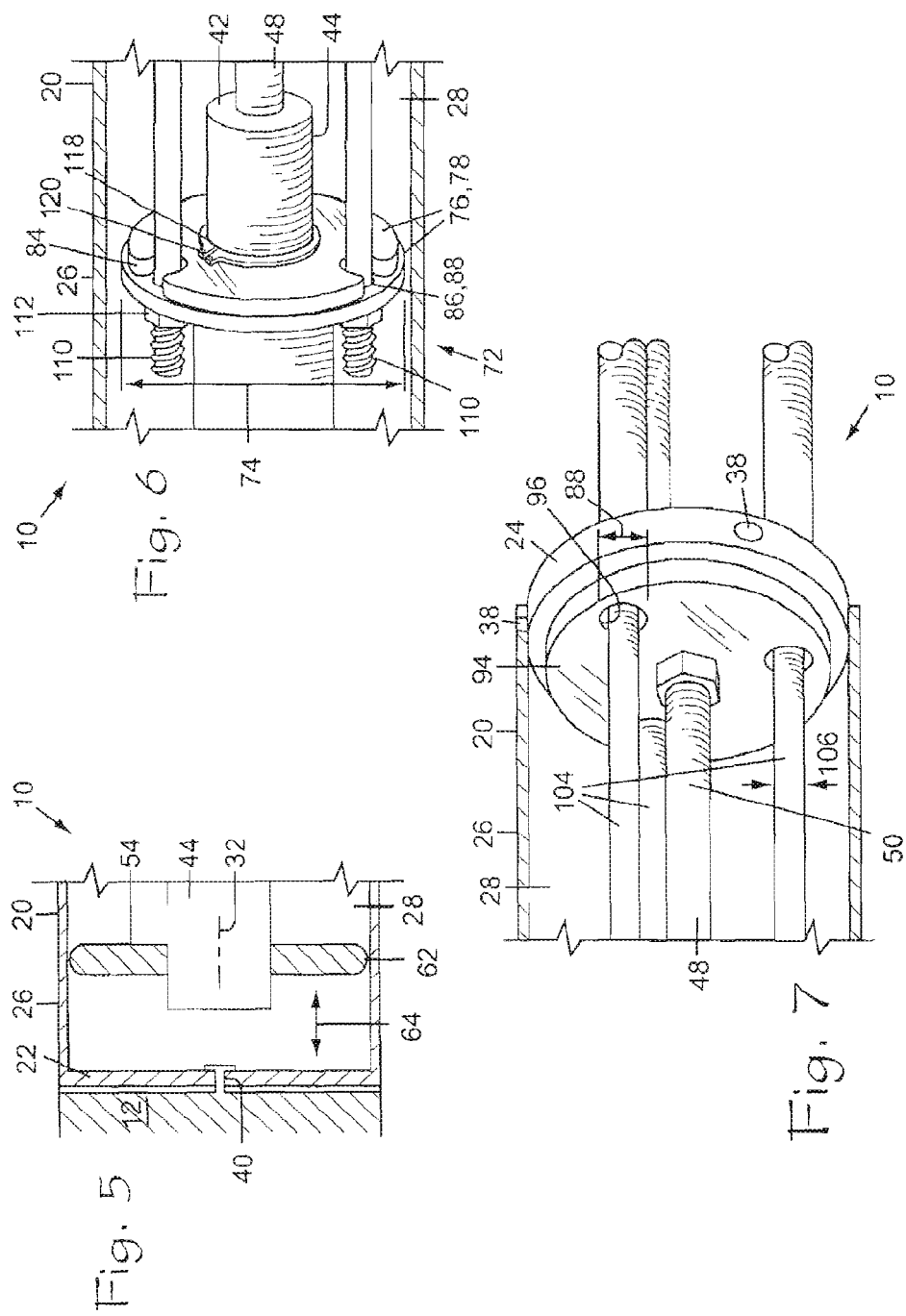

DYNAMIC STEERING STABILIZER DEVICE FOR VEHICLES

BACKGROUND OF THE INVENTION

1. Field of the Invention

The present invention relates generally to steering stabilizing mechanisms for vehicles.

2. Description of the Related Art

Stabilizing mechanisms are useful for controlling unexpected steering changes when a vehicle unexpectedly encounters some type of interference, such as a pothole, an uneven place in a roadway, a blown tire, a sudden wind gust such as from a passing truck, or other similar phenomena. Stabilizing mechanisms react to changing driving conditions to thereby correct the steering of the vehicle so it continues to travel a desired path along a straightaway.

Some stabilizing mechanisms, such as that disclosed in U.S. Pat. No. 6,698,777 of John Shepherd for example, are adjustable to counter constant disturbances such as a crosswind to thereby minimize driver fatigue. Such mechanisms are particularly important for large and heavy vehicles, such as tractor-trailer units and motorhomes for example. Unfortunately, such stabilizing mechanisms are generally expensive and complicated. Although operators of smaller, lighter-weight vehicles can usually compensate for temporary, driving hindrances, stabilizing mechanisms still provide a useful safety precaution. Unfortunately, the expense and complexity of prior art stabilizing mechanisms inhibit widespread use thereof in smaller, lighter-weight vehicles.

What is needed is a relatively simple and economical dynamic steering stabilizer for smaller lighter-weight vehicles.

SUMMARY OF THE INVENTION

The improvements of the present invention for a dynamic steering stabilizer device for vehicles includes a device having a proximal end connectable to a fixed part of the vehicle, a distal end connectable to a movable part of a steering mechanism of the vehicle, a housing having a proximal end connected to the proximal end of the device, a distal end, and a sidewall forming a cavity with a longitudinal axis wherein the distal end includes a plurality of off-center orifices spaced equiangularly around the longitudinal axis; a control mechanism; and a centering mechanism.

The control mechanism, which maintains the device in an equilibrium configuration wherein the vehicle normally travels unassistedly along a straightaway, includes a gas spring, first and second members, a plurality of displacement rods, and sleeves. The gas spring includes a cylinder portion having a peripheral groove with a retainer and a rod portion with a distal end. The first member has a central orifice slidably surrounding the cylinder portion of the gas spring, and is structured to be displaceable along the longitudinal axis. The second member, which is secured to the distal end of the rod portion, is structured to be displaceable along the longitudinal axis. The second member includes a plurality of off-center orifices having a diameter which is smaller than the diameter of, and is respectively aligned with, the off-center orifices of the distal end of the housing, The displacement rods have proximal and distal ends, which connect the first member to the distal end of the device and have a diameter that is smaller than the off-center diameter of, and extend through, the off-center orifices of the first and second members. The proximal ends of the displacement rods extend through the off-center orifices of the first member and threadably mate with fasteners wherein the first member is normally sandwiched between the retainer and the fasteners.

Sleeves, which surround the distal end of each displacement rod, normally extend from the second member to the distal end of the device and have a diameter which is greater than diameter of the second member but is smaller than diameter of the off-center orifices of the housing.

The centering mechanism is structured to maintain the gas spring in alignment with the longitudinal axis.

As driving conditions cause the device to be extended from the equilibrium configuration, the first portion and the cylinder portion are displaced toward the second portion whereupon the gas spring is activated thereby responsively and automatically urging the device to return to the equilibrium configuration. Similarly, as driving conditions cause the device to be compressed from the equilibrium configuration, the second portion and the rod portion are displaced toward the first portion whereupon the gas spring is activated thereby responsively and automatically urging the device to return to the equilibrium configuration.

PRINCIPAL OBJECTS AND ADVANTAGES OF THE INVENTION

The principal objects and advantages of the present invention include: providing a dynamic steering stabilizer for smaller, lighter-weight vehicles; providing such a dynamic steering stabilizer that has a relatively simple and non-complex structure; providing such a dynamic steering stabilizer that is economical to manufacture, assemble and install; and generally providing such a dynamic steering stabilizer which is reliable in performance, capable of long-lasting life, and particularly well adapted for the proposed usages thereof.

Other objects and advantages of this invention will become apparent from the following description taken in conjunction with the accompanying drawings wherein are set forth, by way of illustration and example, certain embodiments of this invention.

BRIEF DESCRIPTION OF THE DRAWING FIGURES

FIG. 1 is a partially schematic, side perspective view of a dynamic steering stabilizer for vehicles with portions cut away to reveal details thereof, according to the present invention.

FIG. 2 is an enlarged and fragmentary, cross-sectional side view of a proximal end of the dynamic steering stabilizer device for vehicles shown in FIG. 1.

FIG. 3 is an enlarged and fragmentary, cross-sectional side view of a first member of a control mechanism and a centering mechanism of the dynamic steering stabilizer for vehicles shown in FIG. 1.

FIG. 4 is an enlarged and fragmentary, cross-sectional side view of a second member of a control mechanism of the dynamic steering stabilizer for vehicles shown in FIG. 1.

FIG. 5 is a schematic and fragmentary cross-sectional representation of an alternative centering mechanism of the dynamic steering stabilizer device for vehicles.

FIG. 6 is a further enlarged and fragmentary, perspective side view of the first member of the control mechanism of the dynamic steering stabilizer device for vehicles shown in FIG. 3.

FIG. 7 is a further enlarged and fragmentary, perspective side view of the second member of the control mechanism of the dynamic steering stabilizer for vehicles shown in FIG. 4, according to the present invention.

DETAILED DESCRIPTION OF THE INVENTION

As required, embodiments of the present invention are disclosed herein, however, it is to be understood that the disclosed embodiments are merely exemplary of the invention, which may be embodied in various forms. Therefore, specific structural and functional details disclosed herein are not to be interpreted as limiting, but merely as a basis for claims and as a representative basis for teaching one skilled in the art to variously employ the present invention in virtually any appropriately detailed structure.

The reference numeral 10 generally refers to a dynamic steering stabilizer for vehicles according to the present invention as shown in FIGS. 1 through 7. Stabilizer 10 includes a proximal end 12 structured to be connectable to a fixed part 14 of a vehicle, a distal end 16 structured to be connectable to a movable part 18 of a steering mechanism of the vehicle, and a housing 20 having a proximal end 22 connected to the proximal end 12 of stabilizer 10, a distal end 24, and a sidewall 26 which form a cavity 28 having diameter 30 and longitudinal axis 32, as shown in FIGS. 1 and 3. It is to be understood that for some applications of the present invention, it may be desirable to secure the proximal end 12 to a movable part 18 of the steering mechanism of the vehicle, and the distal end 16 to a fixed part 14 of the vehicle. The distal end 24 of the housing 20 includes a plurality of symmetrically-spaced off-center orifices 34, preferably three, each having diameter 36 as shown in FIG. 1. Preferably, distal end 24 is removably secured to sidewall 26, such as by screws 38, as shown in FIG. 4 for example, to thereby provide access to cavity 28.

For some applications of the present invention, it may be desirable to connect proximal end 22 of the housing 20 to proximal end 12 of stabilizer 10 with a swivel mechanism 40 as schematically indicated in FIG. 5.

Stabilizer 10 also includes a gas spring 42 such as, for example, a Lift-O-Mat Model 1200N as provided by Stabilus GmbH, Koblenz, Germany. Gas spring 42 has a cylinder portion 44 with diameter 46 and a rod portion 48 having distal end 50.

Stabilizer 10 also includes a centering mechanism 54 structured to maintain cylinder portion 44 in alignment with cavity 28. For example, the centering mechanism 54 may include a guide tube 56 having a base end 58 secured to proximal end 22, a stop end 60, and an axis colinearly aligned with longitudinal axis 32. Cylinder portion 44 is mounted in guide tube 56 to be slidably displaceable therein along axis 32.

Alternatively, centering mechanism 54 may include a spacer 62 constructed of nylon or other suitable material and secured to cylinder portion 44, as schematically shown in FIG. 5, to maintain cylinder portion 44 in alignment with axis 32 as cylinder portion 44 is being displaced as indicated by the arrow designated by numeral 64.

Stabilizer 10 further includes a control mechanism 70 having a first member 72 with diameter 74, which is smaller than diameter 30 of cavity 28, as shown in FIG. 6. For some applications of the present invention, it may be desirable that first member 72 comprises two side-by-side disks 76, 78, one of which is constructed of steel or other suitably rugged material and the other constructed of nylon or other suitable material. First member 72 includes a central orifice 80 having a diameter 82, which slidingly surrounds cylinder portion 44, and a plurality of off-center openings 34 or orifices 86 having diameter 88 aligned with orifices 34 of distal end 24 of housing 20.

Control mechanism 70 also includes second member 90, constructed of steel or other suitably rugged material, having off-center orifices 96, each having diameter 88 and also being aligned with orifices 34 of distal end 24 of housing 20. Distal end 50 of rod portion 48 is secured to second member 90, as shown in FIGS. 4 and 7.

Control mechanism 70 also includes a plurality of displacement rods 104 having a diameter 106, which is smaller than diameter 88 of orifices 96 of second member 94, each displacement rod 104 having a distal end 108 secured to distal end 16 of the device 10, and a proximal end 110, preferably threaded, to receive a fastener 112, such as a nut for example as shown in FIGS. 3 and 6.

Cylinder portion 44 has a peripheral groove 118 thereabout with a retainer 120, such as a spring clip for example, to normally sandwich the first member 72 between retainer 120 and fasteners 112. Sleeves 126, having diameter 128, surrounds distal end 108 of each displacement rod 104 (see dashed lines in FIG. 1). Diameter 128 of sleeves 126 is smaller than diameter 36 of orifices 34 of distal end 24 of housing 20 but larger than diameter 88 of orifices 96 of second member 94.

Alternatively, each displacement rod 104 may comprise an inner rod portion 130 having diameter 106 and extending from first member 72 to and through second member 94, and an outer rod portion 132 having diameter 128 and normally extending from second member 94 to, and secured to, distal end 16 of device 10 wherein the inner and outer rod portions 130, 132 may be either integrally formed together or secured in an end-to-end relationship, such as one end of inner rod portion 130 being threaded 134 and mated with tapped partial bore 136 in a corresponding outer rod portion 132, as shown in FIG. 4 for example.

For some applications of the present invention, it may be desirable to include one or more bumpers 138 to serve as impact absorbers, and bushings 140 made of nylon or other suitable material, as indicated in FIGS. 3 and 4 to thereby minimize wear and prevent debris and other contaminants from entering cavity 28 of the dynamic steering stabilizer 10.

In an application of the present invention, stabilizer 10 is installed between a fixed part 14 of a vehicle and the movable part 18 of the steering mechanism of the vehicle. First member 72 is sandwiched between fasteners 112 and retainer 120, with cylinder portion 44 bearing directly or indirectly against proximal end 12, and first member 72 abuttingly engaging, or spaced in close proximity to, stop end 60 of guide tube 56 thereby operatively causing the vehicle to travel a straight-away path along a roadway, sometimes referred to herein as an equilibrium configuration of the stabilizer 10.

As driving conditions change wherein the steering mechanism of the vehicle causes stabilizer 10 to be compressed from the equilibrium configuration wherein displacement rods 104 are displaced inwardly by sliding through orifices 86 of first member 72, and sleeves 126 or outer rod portions 132 bear against and push second member 94 inwardly which causes second member 94 and rod portion 48 to be displaced toward first member 72 thereby activating gas spring 42, which simultaneously and responsively urges stabilizer 10 back toward the equilibrium configuration and automatically countering the compression of stabilizer 10 caused by the change in driving conditions.

If, instead, the driving conditions change wherein the steering mechanism causes stabilizer 10 to be extended from the equilibrium configuration with displacement rods 104 displacing sandwiched first member 72 and cylinder portion 44 toward second member 94 thereby activating gas spring 42, which simultaneously and responsively urges stabilizer 10 back toward the equilibrium configuration and automatically countering the extension of stabilizer 10 caused by the change in driving conditions.

It is to be understood that while certain forms of the present invention have been illustrated and described herein, it is not to be limited to the specific forms or arrangement of parts as described and shown.

We claim:

1. An apparatus for stabilizing the steering of a vehicle, comprising:
    (a) a device having:
        (1) a proximal end (12) connectable to a fixed part of a vehicle, and a distal end (16) connectable to a movable part of a steering mechanism of the vehicle, and
        (2) a housing having a proximal end (22) connected to proximal end (12) of the device, a distal end (24), and a sidewall which forms a cavity with a longitudinal axis;
    (b) a control mechanism structured to maintain the device in an equilibrium configuration wherein the vehicle normally travels unassistedly along a straightaway, the control mechanism including:
        (1) a gas spring having a cylinder portion and a rod portion with a distal end (50),
        (2) a first member connected to the cylinder portion and structured to be displaceable along the longitudinal axis, and
        (3) a second member secured to distal end (50) of the rod portion and structured to be displaceable along the longitudinal axis; and
    (c) a centering mechanism structured to maintain the gas spring in alignment with the longitudinal axis;
    (d) wherein, as driving conditions cause the device to be extended from the equilibrium configuration, the first member and the cylinder portion are displaced toward the second member whereupon the gas spring is activated thereby responsively and automatically urging the device to return to the equilibrium configuration, and as driving conditions cause the device to be compressed from the equilibrium configuration, the second member and the rod portion are displaced toward the first member whereupon the gas spring is activated thereby responsively and automatically urging the device to return to the equilibrium configuration.

2. An apparatus as defined in claim 1, wherein the control mechanism includes:
    (a) the distal end (24) of the housing having at least one off-center orifice (34) having diameter (36);
    (b) the second member having an off-center orifice (96) aligned with each at least one orifice (34) of the distal end of the housing, each orifice (96) having a diameter (88), which is smaller than diameter (36) of the distal end of the housing;
    (c) the first member having a central orifice (80) slidably surrounding the cylinder portion of the gas spring, and an off-center orifice (86) aligned with each at least one orifice (34) of the distal end of the housing;
    (d) a displacement rod aligned with each at least one orifice (34) of the distal end of the housing and connecting the first member to distal end (16) of the device, each displacement rod having a diameter (106), which is smaller than diameter (88) of the first and second members.

3. An apparatus as defined in claim 1, wherein the control mechanism includes:
    (a) the distal end (24) of the housing having at least one off-center orifice (34) having diameter (36);
    (b) the second member having an off-center orifice (96) aligned with each at least one orifice (34) of the distal end of the housing, each orifice (96) having a diameter (88) which is smaller than diameter (36) of the distal end of the housing;
    (c) the first member having a central orifice (80) slidably surrounding the cylinder portion of the gas spring, and an off-center orifice (86) aligned with each at least one orifice (34) of the distal end of the housing;
    (d) a displacement rod aligned with each at least one orifice (34) of the distal end of the housing and connecting the first member to distal end (16) of the device, each displacement rod including:
        (1) an inner rod portion normally extending from the first member to and through the second member and having a diameter (106), which is smaller than diameter (88) of the first and second members, and
        (2) an outer rod portion normally extending from the second member to distal end (16) of the device and having diameter (128), which is greater than diameter (88) of the second member but smaller than diameter (36) of the distal end of the housing.

4. An apparatus as defined in claim 1, wherein the control mechanism includes:
    (a) distal end (24) of the housing having at least one off-center orifice (34) with diameter (36);
    (b) the second member having an off-center orifice (96) aligned with each at least one orifice (34) of the distal end of the housing, each orifice (96) having a diameter (88), which is smaller than diameter (36) of the distal end of the housing;
    (c) the first member having a central orifice (80) slidably surrounding the cylinder portion of the gas spring, and an off-center orifice (86) aligned with each at least one orifice (34) of the distal end of the housing;
    (d) a displacement rod aligned with each at least one orifice (34) of the distal end of the housing and connecting the first member to the distal end (16) of the device, each displacement rod having a diameter (106) smaller than diameter (88) of the first and second members; and
    (e) a sleeve surrounding each displacement rod and having a length equal to the distance between the second member and distal end (16) of the device in the equilibrium configuration, and having a diameter (128) which is greater than diameter (88) of the second member but smaller than diameter (36) of the distal end of the housing.

5. An apparatus as defined in claim 1, wherein a swivel mechanism is structured to connect proximal end (22) of the housing to proximal end (12) of the device.

6. An apparatus as defined in claim 1, wherein the centering portion includes a guide tube surrounding the cylinder portion and secured to the proximal end (12) of the housing, the cylinder portion being slidably displaceable in the guide tube along the longitudinal axis.

7. An apparatus as defined in claim 1, wherein the centering portion includes a spacer secured to the cylinder portion, the spacer being structured to be slidably displaceable in the cavity along the longitudinal axis.

8. An apparatus as defined in claim 1, wherein the distal end (24) of the housing is removably secured to the sidewall.

9. An apparatus as defined in claim 1, wherein:
    (a) the first member includes an off-center orifice (84) aligned with each at least one orifice (34) of the distal end of the housing;

(b) each displacement rod includes a proximal end (110) extending through a respective orifice (86) of the first member and threadably mated with a fastener; and (c) the cylinder portion includes a peripheral groove with a retainer, the first member normally being sandwiched between the retainer and each fastener.

10. An apparatus as defined in claim 1 wherein the at least one orifice (34) of the distal end of the housing includes three off-center orifices (34) spaced equiangularly around the longitudinal axis.

11. An apparatus as defined in claim 1 wherein the first member includes two side-by-side disks, one constructed of steel or other suitably rugged material, and the other constructed of nylon or other suitable material.

12. An apparatus for stabilizing the steering of a vehicle, comprising:

(a) a device having:
- (1) a proximal end (12) connectable to a fixed part of a vehicle,
- (2) a distal end (16) connectable to a movable part of a steering mechanism of the vehicle, and
- (3) a housing having a proximal end (22) connected to proximal end (12) of the device, a distal end (24), and a sidewall which forms a cavity with a longitudinal axis, the distal end (24) including a plurality of off-center orifices (34) having a diameter (36) and spaced equiangularly around the longitudinal axis;

(b) a control mechanism structured to maintain the device in an equilibrium configuration wherein the vehicle normally travels unassistedly along a straightaway, the control mechanism including:
- (1) a gas spring having a rod portion with a distal end (50) and a cylinder portion having a peripheral groove with a retainer,
- (2) a first member having a central orifice (80) slidably surrounding the cylinder portion of the gas spring and structured to be displaceable along the longitudinal axis, and off-center orifices (86) with diameter (88) aligned with orifices (34) of the distal end of the housing,
- (3) a second member secured to distal end (50) of the rod portion and structured to be displaceable along the longitudinal axis, the second member including a plurality of off-center orifices (96) aligned with, and having a diameter (88) which is smaller than diameter (36) of, orifices (34) of the distal end of the housing,
- (4) a plurality of displacement rods having a proximal end and a distal end connecting the first member to distal end (16) of the device and having a diameter (106) smaller than diameter (88) of the first and second members and respectively aligned with orifices (34) of the distal end of the housing, each proximal end extending through a respective orifice (82) of the first member and threadably mated with a fastener wherein the first member is normally sandwiched between the retainer and the fasteners, and
- (5) a sleeve surrounding each displacement rod and normally extending from the second member to the distal end (16) of the device in the equilibrium configuration, each sleeve having a diameter (128) which is greater than diameter (88) of orifices (96) of the second member but smaller than diameter (36) of the distal end of the housing; and (c) a centering mechanism structured to maintain the gas spring in alignment with the longitudinal axis;

(d) wherein, as driving conditions cause the device to be extended from the equilibrium configuration, the first member and the cylinder portion are displaced toward the second member whereupon the gas spring is activated thereby responsively and automatically urging the device to return to the equilibrium configuration, and as driving conditions cause the device to be compressed from the equilibrium configuration, the second member and the rod portion are displaced toward the first member whereupon the gas spring is activated thereby responsively and automatically urging the device to return to the equilibrium configuration.

* * * * *